(12) United States Patent
Im

(10) Patent No.: US 6,854,939 B2
(45) Date of Patent: Feb. 15, 2005

(54) WINCH BAR

(76) Inventor: Darryl Im, 2345 Fordham Dr., Costa Mesa, CA (US) 92626

( * ) Notice: Subject to any disclaimer, the term of this patent is extended or adjusted under 35 U.S.C. 154(b) by 36 days.

(21) Appl. No.: 10/228,443

(22) Filed: Aug. 26, 2002

(65) Prior Publication Data

US 2004/0037665 A1 Feb. 26, 2004

(51) Int. Cl.$^7$ .................................................. B60P 7/00
(52) U.S. Cl. ........................ 410/100; 410/103; 16/422; 16/436; 74/544
(58) Field of Search .......................... 410/96, 100, 103, 410/156; 16/422, 427, 436; 74/544, 545; 81/177.2, 177.85, 489; 7/168

(56) References Cited

U.S. PATENT DOCUMENTS

| | | | | |
|---|---|---|---|---|
| 2,838,281 A | * | 6/1958 | Flippin | ........................ 410/103 |
| 4,873,742 A | * | 10/1989 | Dillon | |
| 5,425,154 A | * | 6/1995 | Edwards, Jr. | |
| 5,429,463 A | * | 7/1995 | Howell | ........................ 410/156 |
| 5,433,565 A | * | 7/1995 | Chan | ........................... 410/103 |
| 5,791,844 A | * | 8/1998 | Anderson | .................... 410/103 |
| D423,332 S | * | 4/2000 | Salter | |
| 6,056,488 A | * | 5/2000 | Depoy | ........................ 410/100 |
| 6,102,637 A | * | 8/2000 | Mocci | ........................ 410/103 |
| 6,139,233 A | * | 10/2000 | Wilsey | ........................ 410/100 |
| 6,398,470 B1 | * | 6/2002 | Mosley | ........................ 410/100 |
| 6,427,564 B1 | * | 8/2002 | Nelson | |
| 2003/0082022 A1 | * | 5/2003 | Botelho | ...................... 410/100 |

FOREIGN PATENT DOCUMENTS

DE 3416440 A * 11/1985 .............. 81/177.85

* cited by examiner

*Primary Examiner*—Stephen Gordon
(74) *Attorney, Agent, or Firm*—Boniard I. Brown

(57) ABSTRACT

A winch bar has an insertion portion adapted to fit in openings of a winch drum of non-circular cross-section, typically square or hexagonal, whereby the winch bar cannot rotate relative to the openings to present hazards of injury to persons or property which can result with prior art circular drum openings and circular cross-section bars.

14 Claims, 3 Drawing Sheets

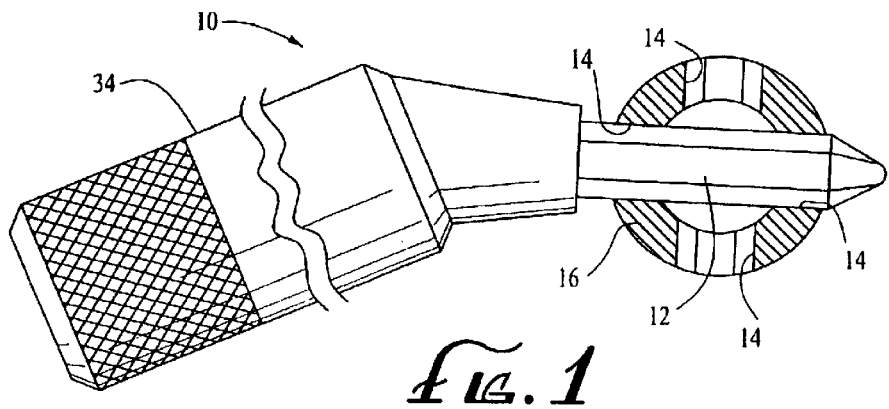
*fig.1*
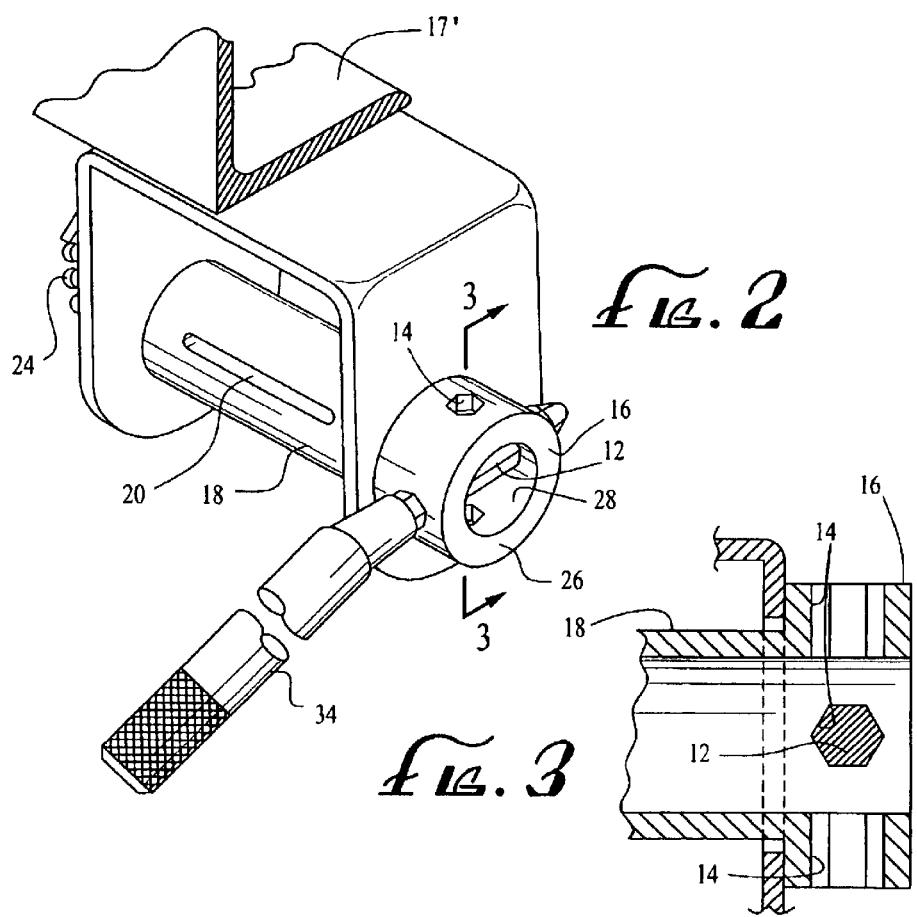
*fig.2*
*fig.3*

WINCH BAR

BACKGROUND AND SUMMARY OF THE INVENTION

Winch apparatus has long been used to secure straps to retain loads and objects, as on trucks and trailers. A winch assembly is typically secured in a bracket which is typically welded or otherwise secured to a base, such as the bed or other portion of a truck trailer or the like.

At least one strap is attached to and secured to a winch drum wherein registering openings are provided through which the winch bar is extended. The winch bar is manually operated to rotate the drum to tighten the strap or straps to retain an object or load.

A long standing problem has been unintentional or undesirable rotation of the winch bar elongate handle portion in the drum openings, when the bar is not manually held. With such rotation, which is typically in a conical path because of an inclined angle between an insertion portion of the bar and an elongate handle portion, the bar rotates in a conical pattern. Hazards to persons and property thus result, and there has been a history of many injuries to persons and property caused by the freely rotating winch bar.

The present invention eliminates such hazardous rotation of a winch bar in the openings of a winch drum. The winch drum openings, comprise at least one pair of openings in diametrically opposite positions in an annular winch drum member. The openings are polygonal, and typically hexagonal or square, so the winch bar cannot rotate because the winch bar insertion portion has a cross-sectional configuration like those of the openings in the drum member.

BRIEF DESCRIPTION OF THE DRAWINGS

FIG. 1 is an elevational view of a winch bar according to the invention in relation to a winch winding drum;

FIG. 2 is a perspective view of a winch bar of the invention in operational assembly with a winch assembly;

FIG. 3 is a sectional view taken at line 3—3 in FIG. 2;

DESCRIPTION OF THE PREFERRED EMBODIMENT

Figure 4:
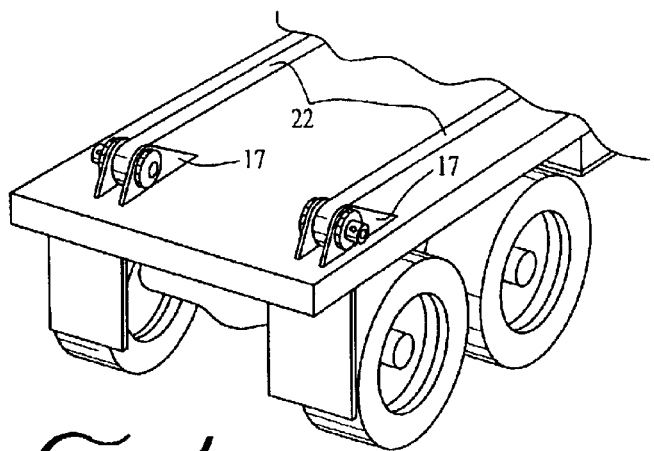
FIG. 4 is a partial perspective view showing two ratchet drive winch assemblies mounted on a truck bed with securement straps extending therefrom.
Figure 5:
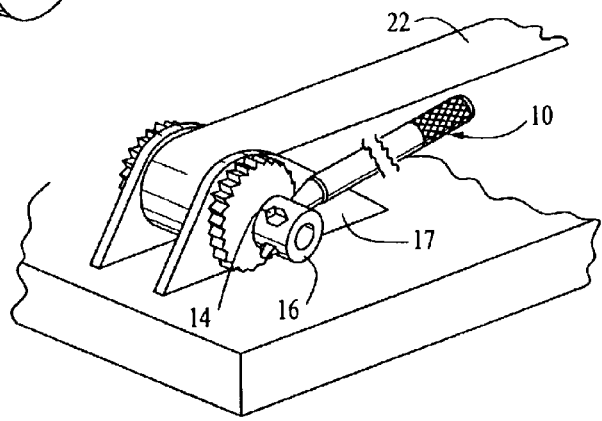
FIG. 5 is a partial perspective view of a winch bar of the invention in operative relation with a ratchet drive winch and a binding strap.
Figure 7:
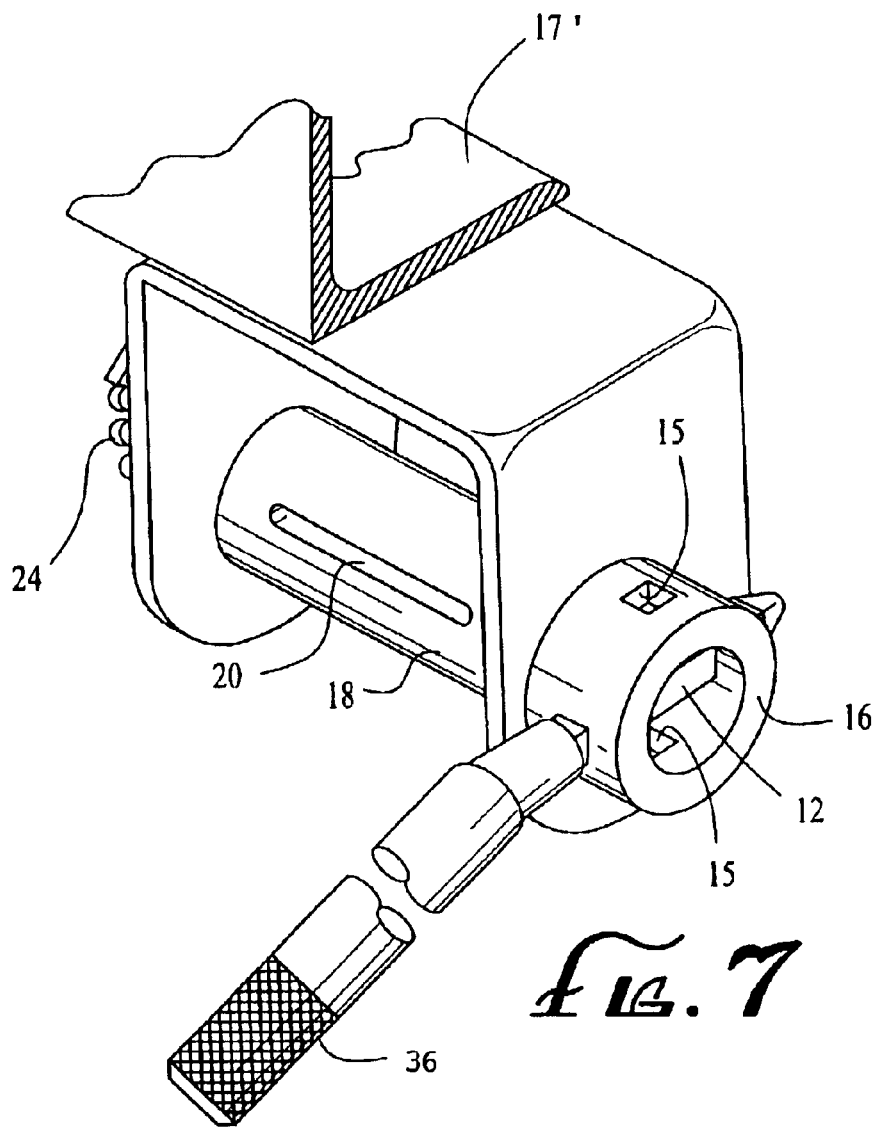
FIG. 7 is a perspective view, similar to the view of FIG. 2, showing a winch bar and a winch drum with cooperating rectangular cross-section winch bar and winch drum openings.

Referring to the drawings, a winch bar 10 according to the invention has a generally hexagonal cross-section end portion 12 adapted to fit in and extend through diametrically opposite hexagonal openings 14 in a drum 16. The drum is rotatably mounted in a bracket 17 welded to a truck bed or other structure, and has spaced-apart openings 14, as shown, to receive a mandrel 18 having thereon a slot 20 to receive a strap 22. The bracket 17 is shown in FIGS. 4 and 5 as comprising two members welded to a truck bed surface, and in FIG. 7 another form of bracket 17', partially shown, is adapted to be secured beneath a truck bed or other member. A ratchet 24, partially shown in FIGS. 2 and 7, is operatively connected between the mandrel and the bracket to prevent the drum from releasing the strap until it is manually released. The ratchet mechanism 24, partially shown in FIG. 2, is conventional and is not illustrated or described in detail. The strap is inserted through the web slot 20 in the mandrel 18 and is pulled through. One or two straps are preferably wound twice about the mandrel to prevent slippage, which can result in problems and damage. Each strap extends about an object or item (not shown) to be retained, as on a freight truck or trailer.

The winch bar is insertable through and fits in the diametrically opposed openings 14 (FIG. 1) or 15 (FIG. 7), as shown. The winch bar has a tapered end portion to facilitate insertion and handling. The drum has an annular wall member 26, a large central opening 28, and a plurality of pairs of diametrically opposed openings. The openings may typically be of an hexagonal configuration (FIGS. 1 and 2) or square configuration 15 of FIG. 7. The winch bar has corresponding cross-sectional configurations of its insertion portion, as shown.

The winch bar has its elongate handle or bar portion 34 disposed at an acute angle relative to its insertion portion 12, as shown in FIG. 1. The handle portion is preferably knurled as indicated at 36 in FIG. 7, in order to provide for otter manual gripping. Another type of highly frictional surface may be provided. The drum 16 is rotatable by manual operation of the winch bar, pulling on the bar tightening the strap or straps 22 (FIGS. 4 and 5) which are secured in tightened position by the ratchet mechanism to secure and retain an object or load (not shown) on a truck bed or other surface.

Figure 6:
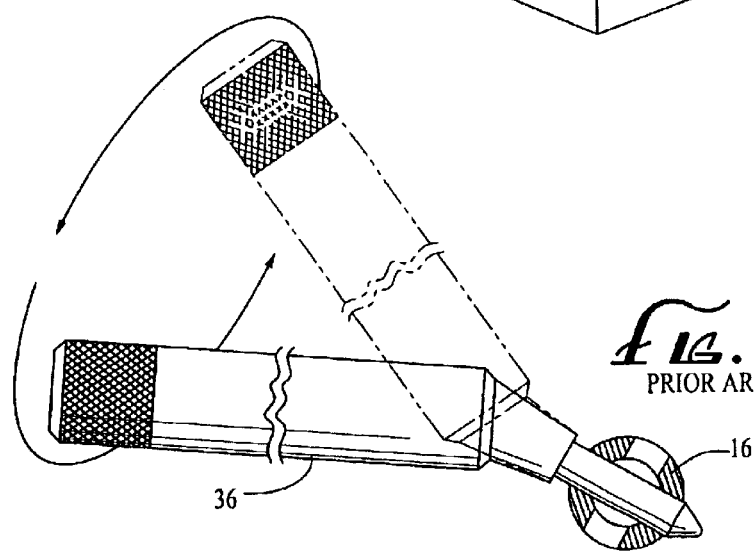
FIG. 6 is an elevational view of a prior art winch bar having a cylindrical insertion portion disposed in circular openings of a drive winch drum.

Accidents and injuries to persons have occurred because of conventional circular openings in the winding drum to receive the winch bar. Because of the angular inclination of the handle portion of the winch bar relative to the insertion end portion 12 thereof, the winch bar end portion rotates in the drum openings in a generally conical pattern, as indicated by arcuate arrows in FIG. 6. In such a swinging arc, thehandle portion 34 of a winch bar can strike objects and persons. Many injuries have resulted from such accidental free rotational conical motion of the winch bar.

It will be understood that various changes and modifications may be made from the preferred embodiment discussed above without departing from the scope of the present invention, which is established by the following claims and equivalents thereof.

What is claimed is:

1. A winch bar and winch drum combination, comprising:
   a winch bar insertion portion having a polygonal cross-sectional configuration adapted to fit in openings of similar cross-sectional polygonal configuration in a winch winding drum, and
   an elongate handle portion of the winch bar disposed at an acute angle relative to the insertion portion for manual grasping thereof for manipulation to rotate the winch winding drum to exert tension force on a retaining strap secured on the winding drum to retain objects secured by the strap,
   whereby with said winch bar insertion portion of polygonal cross-sectional configuration engaged in similarly configured diametrically opposite ones of said openings of the winch winding drum, relative rotation between the winch bar and the winch winding drum openings is prevented to prevent the winch bar from swinging about the winch winding drum openings in a generally conical pattern, thereby preventing injury to persons and damage to property.

2. Apparatus according to claim 1, wherein said winch winding drum has its said openings in diametrically opposite relation.

3. Apparatus according to claim 1, wherein the winch winding drum comprises an annular member wherein its said openings are defined.

4. Apparatus according to claim 1, wherein said winch bar insertion portion and said winding drum openings have cross-sectional configurations which are one of (1) hexagonal, (2) square.

5. Apparatus according to claim 1, wherein rotation of the winch bar in diametrically opposite openings of the winch winding drum prevents rotation of the bar handle portion in a generally swinging conical pattern with hazards to persons and property.

6. Apparatus according to claim 1, wherein said winch drum comprises an annular member defining an enlarged axial opening and having defined therein said diametrically opposite ones of said drum openings adapted to receive the winch bar insertion portion.

7. Apparatus according to claim 1, and further comprising a mounting bracket for securement to an anchoring surface for retaining the drum.

8. Apparatus according to claim 7, and further comprising a ratchet assembly operatively connected between said bracket and said drum to retain the drum in its rotational position until rotated therefrom by manual rotation of the drum by the winch bar.

9. A winch bar and cooperating ratchet drive winch combination for exerting securing tension force on at least one winding strap to secure at least one object on a vehicle, said winch bar comprising:

a winch bar insertion portion for insertion into diametrically opposed polygonal openings in an annular drum of said ratchet drive winch, an elongate winch bar handle portion disposed at an angle relative to the insertion portion, said winch bar insertion portion having a polygonal cross-sectional configuration adapted for cooperation with said annular drum polygonal openings to engage and fit therein to prevent relative rotation between the winch bar and the drum openings, whereby rotation of the winch bar relative to the annular drum is prevented with no rotation of the bar handle portion in a swinging pattern, whereby hazards to persons and property are prevented, and whereby manual manipulation of the handle portion to rotate the winch drive exerts tension force on the at least one winding strap to exert restraining force on at least one object on the vehicle.

10. Apparatus according to claim 9, wherein said annular drum comprises an annular member defining an enlarged axial opening and having defined therein at least one pair of diametrically opposed ones of said openings adapted to receive the winch bar insertion portion.

11. Apparatus according to claim 9, and further comprising a mounting bracket for securement to an anchoring surface for retaining the drum.

12. Apparatus according to claim 11, and further comprising a ratchet assembly operatively connected between said bracket and said drum to retain the drum in its rotational position until rotated therefrom by manual rotation of the drum by the winch bar.

13. Apparatus according to claim 9, wherein the openings are one of (1) hexagonal, (2) square.

14. Apparatus according to claim 9, wherein said winch bar handle portion is knurled for enhanced manual gripping.

\* \* \* \* \*